(12) United States Patent
Lee et al.

(10) Patent No.: US 9,531,948 B2
(45) Date of Patent: Dec. 27, 2016

(54) VOICE TRACKING APPARATUS AND CONTROL METHOD THEREFOR

(71) Applicant: LG ELECTRONICS INC., Seoul (KR)

(72) Inventors: Byounggi Lee, Seoul (KR); Hyejeong Jeon, Seoul (KR); Heungkyu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/759,820

(22) PCT Filed: Jan. 9, 2013

(86) PCT No.: PCT/KR2013/000191
§ 371 (c)(1),
(2) Date: Jul. 8, 2015

(87) PCT Pub. No.: WO2014/109422
PCT Pub. Date: Jul. 17, 2014

(65) Prior Publication Data
US 2015/0341545 A1    Nov. 26, 2015

(51) Int. Cl.
*H04N 7/14* (2006.01)
*H04N 5/232* (2006.01)
*G06K 9/00* (2006.01)
*G10L 25/57* (2013.01)
*G10L 21/0216* (2013.01)

(52) U.S. Cl.
CPC ...... *H04N 5/23216* (2013.01); *G06K 9/00248* (2013.01); *G10L 25/57* (2013.01); *H04N 7/142* (2013.01); *G10L 2021/02166* (2013.01); *H04N 7/141* (2013.01)

(58) Field of Classification Search
CPC .......... H04N 7/14; H04N 7/142; H04N 7/141; H04N 5/23216; G10L 21/0216; G10L 25/57; G10L 2021/02166; G06K 9/00248
USPC .......................................... 348/14.01–14.16
See application file for complete search history.

(56) References Cited

U.S. PATENT DOCUMENTS

| | | | | |
|---|---|---|---|---|
| 5,434,617 A | * | 7/1995 | Bianchi | G01S 3/7865 348/169 |
| 6,980,485 B2 | * | 12/2005 | McCaskill | H04N 7/142 348/E7.079 |
| 2004/0267521 A1 | * | 12/2004 | Cutler | G10L 15/25 704/202 |
| 2009/0028347 A1 | * | 1/2009 | Duraiswami | H04R 1/406 381/26 |
| 2011/0285808 A1 | * | 11/2011 | Feng | H04N 7/142 348/14.09 |
| 2012/0124602 A1 | | 5/2012 | Tan et al. | |

(Continued)

FOREIGN PATENT DOCUMENTS

KR    10-0565184 B1    6/2006
KR    10-2012-0071452 A    7/2012

*Primary Examiner* — Melur Ramakrishnaiah
(74) *Attorney, Agent, or Firm* — Birch, Stewart, Kolasch & Birch, LLP

(57) ABSTRACT

A method for controlling a voice tracking apparatus according to an embodiment of the present invention includes the steps of: tracking a sound source of a voice signal generated from the outside; turning an image capturing unit of the voice tracking apparatus toward the location of the tracked sound source; and beamforming the voice signal of the sound source through a voice input unit mounted on the image capturing unit.

12 Claims, 10 Drawing Sheets

(56) References Cited

U.S. PATENT DOCUMENTS

2012/0163624 A1 6/2012 Hyun
2013/0093831 A1* 4/2013 Cutler ................... H04N 7/142
348/14.01

* cited by examiner

FIG. 4
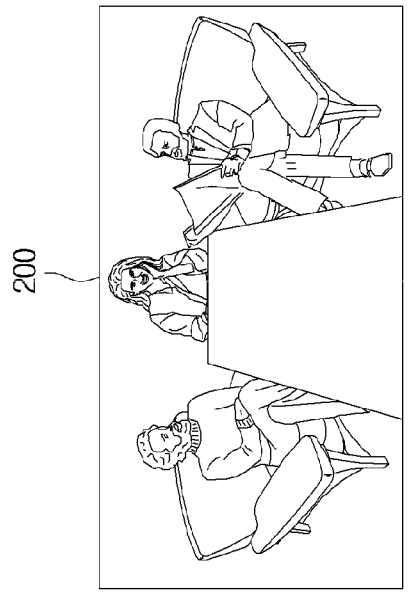
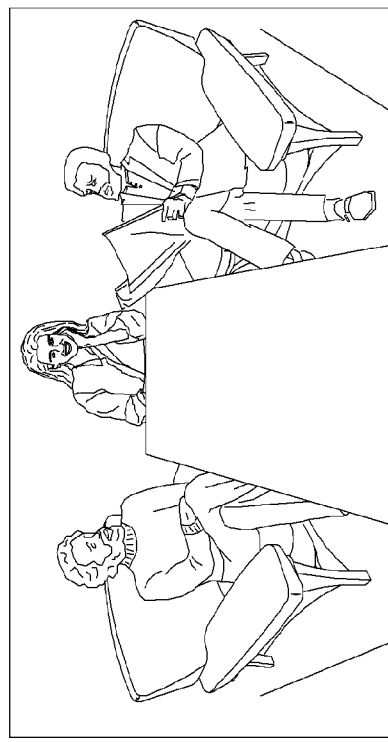
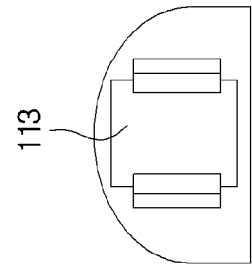
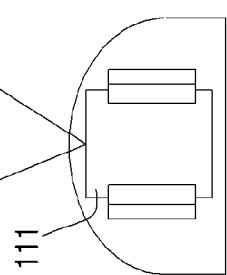

FIG. 6
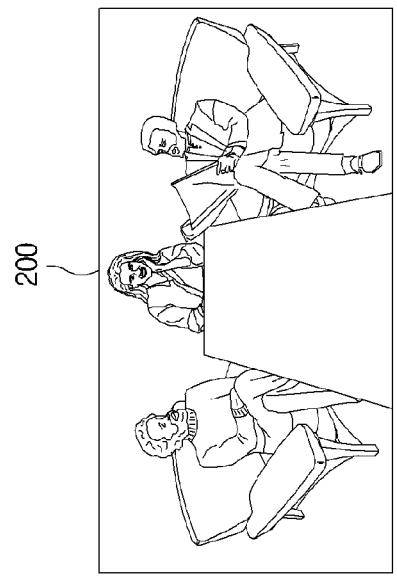
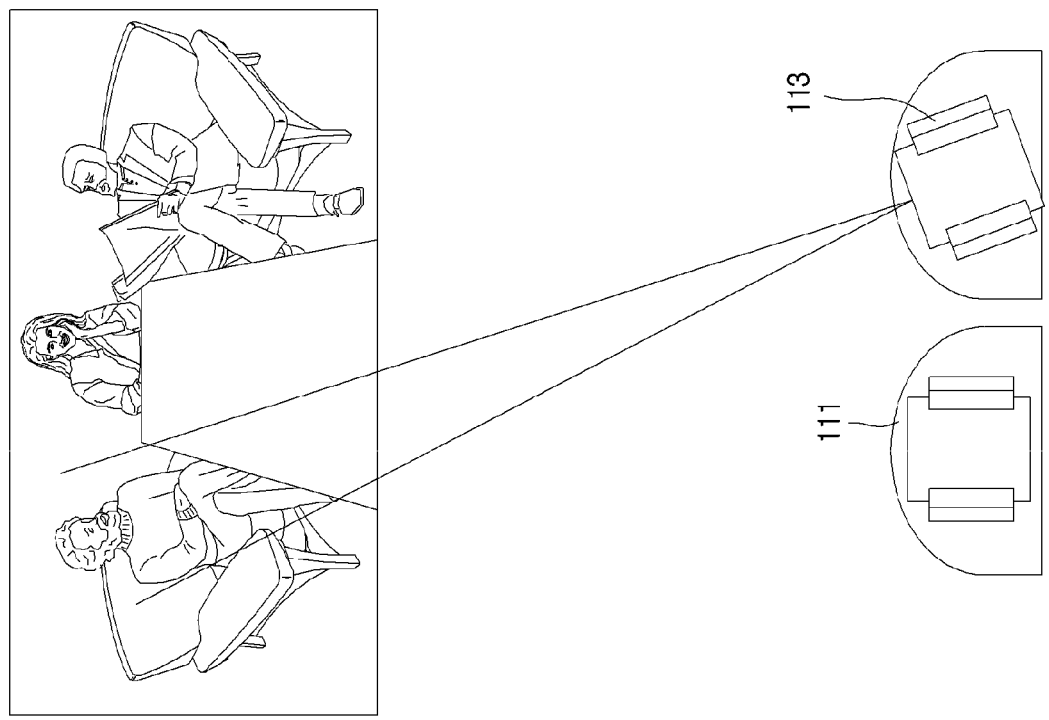

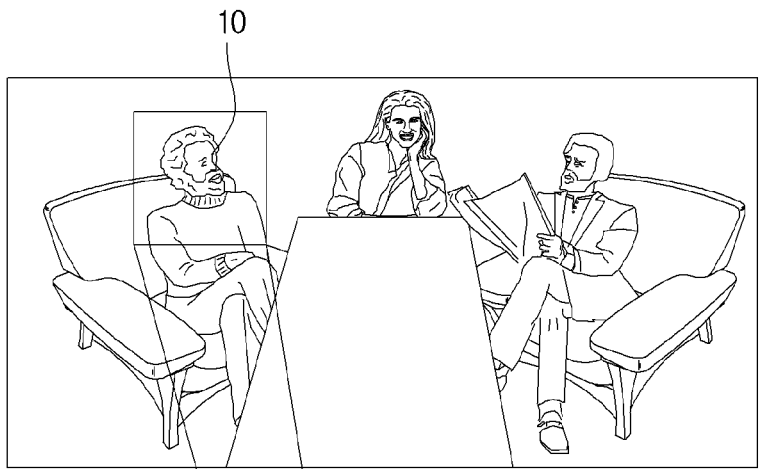
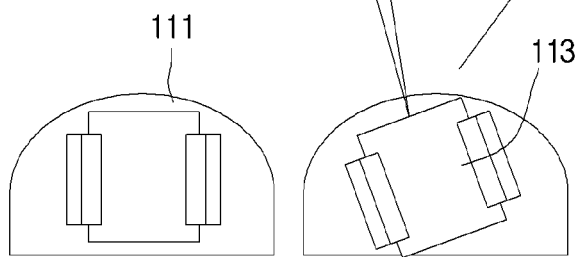
FIG. 7

VOICE TRACKING APPARATUS AND CONTROL METHOD THEREFOR

TECHNICAL FIELD

The present disclosure relates to a voice tracking apparatus and a control method therefor, and more particularly, to a voice tracking apparatus that may effectively obtain an image and voice information, and a control method therefore.

BACKGROUND ART

A general camera needs for a user to put a preview screen on the center of a subject manually in order to capture an image of the subject. However, in the process of conducting video conference, there is inconvenience in that a user needs to operate a camera and thus a voice tracking apparatus has been developed.

The voice tracking apparatus may provide a microphone for tracking a sound source and a fan-tilting motor to capture the location of a sound source from which a voice signal is generated. That is, the voice tracking apparatus automatically tracks the sound source of the voice signal and moves a camera to the location of the tracked sound source to obtain an image of a location of interest.

However, since a typical voice tracking apparatus turns only a camera to the location of a sound source from which the voice signal is generated, it has failed to obtain the voice signal of the sound source effectively and selectively.

DISCLOSURE OF THE INVENTION

Technical Problem

Embodiments provide a voice tracking apparatus that may effectively track the location of a sound source to intensively obtain the voice signal of the sound source, and a control method therefor.

Embodiments provide a voice tracking apparatus that may match an image corresponding to a sound source with the direction of the sound source to effectively perform the beamforming of a voice signal generated from the sound source, and a control method therefor.

Technical Solution

In one embodiment, a control method of a voice tracking apparatus includes tracking a sound source of a voice signal generated from the outside; turning an image capturing unit of the voice tracking apparatus toward the location of the tracked sound source; and beamforming the voice signal of the sound source through a voice input unit mounted on the image capturing unit.

In another embodiment, a voice tracking apparatus includes an image capturing unit; a voice input unit mounted on the image capturing unit and receiving a voice signal generated from the outside; a sound source tracking unit tracking the sound source of the received voice signal; a driving unit turning the image capturing unit toward the location of the tracked sound source; and a control unit beamforming the voice signal of the tracked sound source according to the turning of the image capturing unit.

Advantageous Effects

Embodiments may effectively track the location of a sound source to intensively obtain the voice signal of the sound source.

Embodiments may match an image corresponding to a sound source with the direction of the sound source to effectively perform the beamforming of a voice signal generated from the sound source.

BRIEF DESCRIPTION OF THE DRAWINGS

FIG. 4 shows the process of displaying, on a display device, an image captured through a first camera of a voice tracking apparatus according to an embodiment.

FIG. 6 shows the process of turning a second camera toward a tracked sound source according to an embodiment.

FIG. 7 shows the process of zooming in an image of where there is a sound source according to an embodiment.

MODE FOR CARRYING OUT THE INVENTION

Hereinafter, a voice tracking apparatus relating to embodiments will be described in more detail with reference to the accompanying drawings. Since the suffixes "module" and "unit" for components used in the following description are given and interchanged for easiness in making the present disclosure, they do not have distinct meanings or functions.

The voice tracking apparatus according to an embodiment may be applied to a voice conference system (VCS). However, the present disclosure has no need to be limited thereto and may be used in various technologies tracking voice. The VCS is a system that receives voice and a picture simultaneously through a display screen to conduct the meeting in different two places and thus provides the same effect as if the meeting was conducted in one office.

A structure of the voice tracking apparatus according to an embodiment is described below with reference to FIG. 1.

Figure 1:
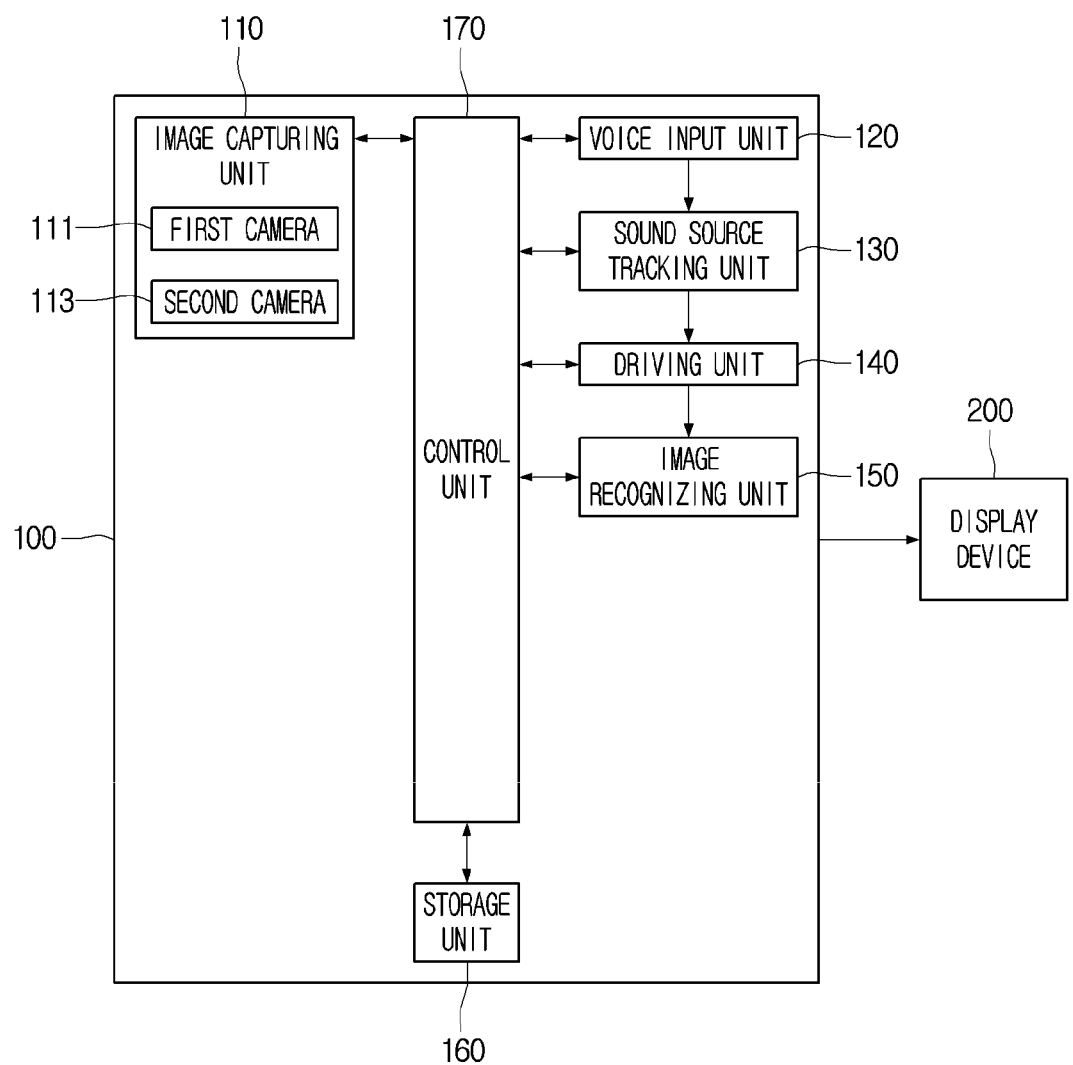
FIG. 1 is a block diagram of a voice tracking apparatus related to an embodiment.

FIG. 1 is a block diagram of the voice tracking apparatus related to an embodiment.

Referring to FIG. 1, a voice tracking apparatus 100 may include an image capturing unit 110, a voice input unit 120, a sound source tracking unit 130, a driving unit 140, an image recognizing unit 150, a storage unit 160, and a control unit 170.

In the following, the components above are discussed one by one.

The image capturing unit 110 may include a first camera 111 and a second camera 113. The image capturing unit 110 may also include two or more cameras depending on the usage condition.

A picture frame processed by the image capturing unit 110 may be stored in the storage unit 160 or transmitted to the display device 200 through wireless communication. The display device 200 may display an image received from the image capturing unit 110.

The voice input unit 120 may receive a voice signal generated from the outside while an image is being captured by the image capturing unit 110. In an embodiment, the voice input unit 120 may include at least one microphone. Various noise removing algorithms for removing noise generated in the process of receiving an external voice signal may be implemented in the microphone.

The voice input unit 120 may be mounted on the second camera 113 and include at least one microphone.

The sound source tracking unit 130 may use a received voice signal to tract the sound source of the voice signal. In an embodiment, the sound source tracking unit 130 may track a sound source generated from the outside according to a time difference of arrival (TDOA) technique. Related description is provided below in detail.

The driving unit 140 may turn the second camera 113 toward the sound source tracked by the sound source tracking unit 130. In an embodiment, the driving unit 140 may be a driving motor. As the driving unit 140 turns the second camera 113 toward the sound source, a plurality of microphones mounted on the camera 113 may also be turned toward the sound source. In an embodiment, the driving motor may turn the second camera 113 horizontally and vertically.

The image recognizing unit 150 may recognize an image of a sound source by using an image enlargedly captured through the second camera 113.

The storage unit 160 may store programs for the operation of the control unit 170 and temporarily store data (e.g., a phone book, a message, a still image, and a video) that is input and output.

The storage unit 160 may include at least one type of storage medium from among a flash memory type, a hard disk type, a multimedia card micro type, a card type memory (e.g., an SD memory, an XD memory, etc.), a random access memory (RAM), an static random access memory (SRAM), a read-only memory (ROM), an electrically erasable programmable read-only memory (EEPROM), a programmable read-only memory (PROM), a magnetic memory, a magnetic disc and an optical disc.

The control unit 170 may control the overall operations of the voice tracking apparatus 100.

In particular, the control unit 170 may check whether an image recognized as a sound source matches an image of a speaker, and transmit, to the display device 200, the image of the speaker enlargedly captured through the second camera 113 when the image the recognized with the sound source matches the image of the speaker.

Also, the control unit 170 may perform beamforming on the voice of a speaker being captured through the second camera 113. Related description is provided below in detail.

Next, a control method of the voice tracking apparatus according to an embodiment is described with reference to FIG. 2 in conjunction with FIG. 1.

Also, the control method of the voice tracking apparatus 100 according to an embodiment is described below by applying it to a situation where a video conference is conducted.

Figure 2:
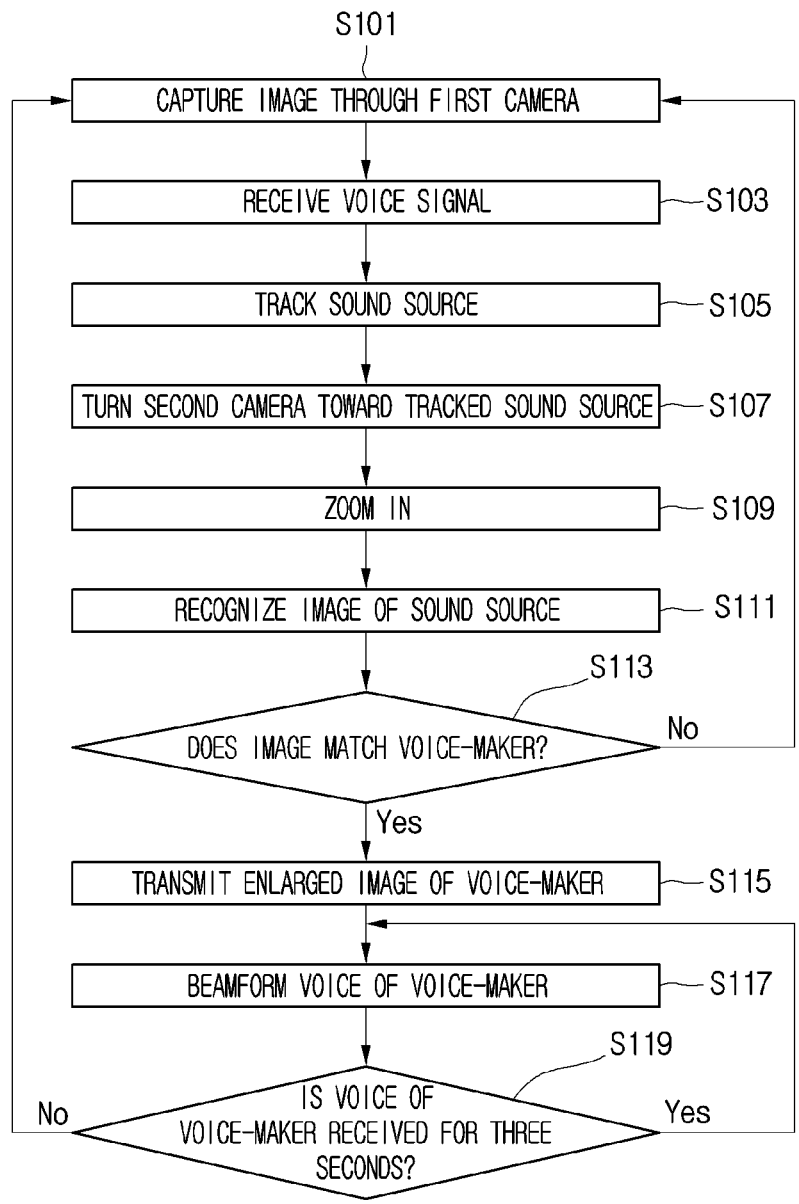
FIG. 2 is a flow chart for explaining a control method of a voice tracking apparatus according to an embodiment.

FIG. 2 is a flow chart for explaining the control method of the voice tracking apparatus according to an embodiment.

The first camera 111 of the image capturing unit 110 captures a still image or video in step S101. Related description is provided with reference FIGS. 3 to 4

Figure 3:
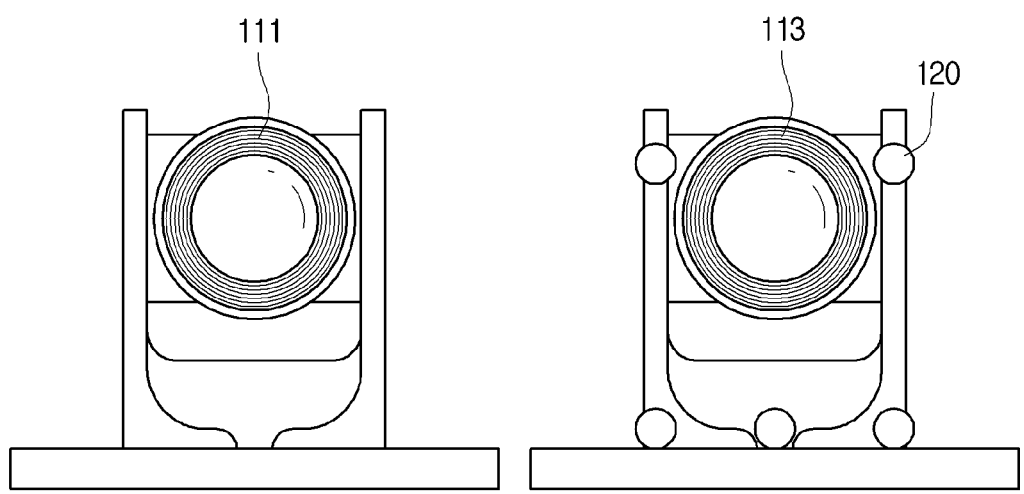
FIG. 3 shows an actual implementation of a voice tracking apparatus according to an embodiment.

FIG. 3 shows an actual implementation of the voice tracking apparatus according to an embodiment, and FIG. 4 shows the process of displaying, on the display device, an image captured through the first camera of the voice tracking apparatus according to an embodiment.

Referring to FIG. 3, the image capturing unit 110 of the voice tracking apparatus 100 may include two cameras. In this example, the two cameras are only an example. That is, the image capturing unit 110 may include the first camera 111 and the second camera 113 and process a picture frame such as a still image or video obtained by an image sensor. The processed picture frame may be displayed on the display device that is provided separately from the voice tracking apparatus 100.

A plurality of microphones may be mounted on the second camera 113 and external voice signals may be input to the plurality of microphones. The microphones may be disposed on one side of the second camera 113 at certain intervals.

Referring to FIG. 4, when the first camera 111 captures the entire scene of a video conference and transmit it to the display device 200, the display device 200 displays the captured entire scene. In this case, the second camera 113 may maintain a state in which its operation stops.

Refer back to FIG. 2.

The voice input unit 120 of the voice tracking apparatus 100 receives a voice signal generated from the outside while an image is being captured through the first camera 111, in step S103. In an embodiment, the voice input unit 120 may include at least one microphone. The microphone may receive an external voice signal, process the received voice signal to be electrical voice data, and detect a voice signal generated from the outside through the voice data obtained through processing.

Referring to FIG. 3, the voice input unit 120 may include a plurality of microphones mounted on the second camera 113. The voice input unit 120 may receive a voice signal generated around the voice tracking apparatus 100 through the plurality of microphones. More particularly, the plurality of microphones 120 may be mounted on the turning body of the second camera 113, and as the second camera 113 rotates, the plurality of microphones may also turn together.

The voice data obtained through processing may be output through a speaker mounted on the voice tracking apparatus 100. In an embodiment, the speaker may be provided separately from the voice tracking apparatus 100 and receive, from the voice tracking apparatus 100, the voice data obtained through processing to output the received voice data as a voice signal.

Refer back to FIG. 2.

The sound source tracking unit 130 of the voice tracking apparatus 100 uses the received voice signal to tract the sound source of the voice signal in step S105. In an embodiment, the sound source tracking unit 130 may tract a sound source generated from the outside according to a TDOA technique. The TDOA technique is a location measurement technique that measures the relative difference between wave arrival times from two signal sources to determine the location of a sound source. Related descriptions are provided with reference to FIG. 5.

Figure 5:
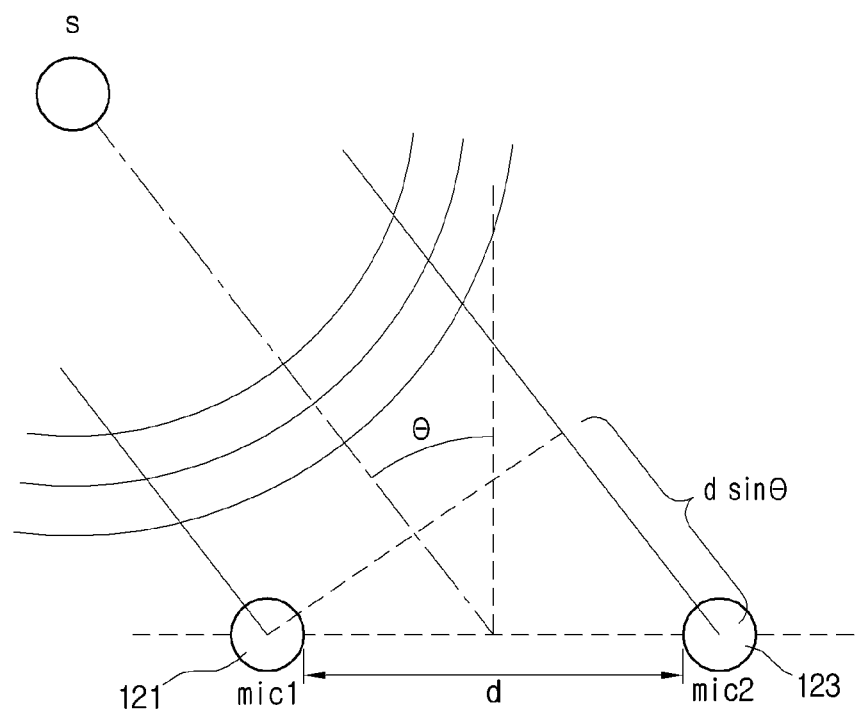
FIG. 5 shows the process of tracking a sound source by using a time difference of arrival technique according to an embodiment.

FIG. 5 shows the process of tracking a sound source by using an TDOA technique according to an embodiment.

Referring to FIG. 5, the voice input unit 120 of the voice tracking apparatus 100 may include two microphones 121 and 123. In this example, the two microphones are only an example.

It is assumed that the distance between the first microphone 121 and the second microphone 123 is dcm. A vertical line perpendicular to a line connecting the first microphone 121 and the second microphone 123 is drawn from the central point O connecting the first microphone 121 and the second microphone 123. In this case, when it is assumed that a sound source angle that a line connecting the sound source S and the central point O and the vertical line make is θ, the TDOA between a time at which a voice signal generated from the sound source S arrives at the first microphone 121 and a time at which a voice signal generated from the sound source S arrives at the second microphone 123 may be expressed by Equation 1 below:

$$t_{delay} = \frac{d\sin\theta}{V_{sound}}$$ [Equation 1]

where Vsound is the speed of a voice signal generated from the sound source S, d sin θ denotes the difference between a distance until the voice signal generated from the sound source S arrives at the first microphone 11 and a distance until the voice signal generated from the sound source S arrives at the second microphone 12, and tdelay denotes the TDOA.

Since the speed of the voice signal Vsound, the distance d between the first microphone 11 and the second microphone 12, and the TDOA tdelay are values that may be known by measurement, the sound source tracking unit 130 may use these values to calculate the sound source angle θ.

When the angle θ is calculated, at which angle to the first microphone 121 and the second microphone 123 the sound source S is generated may be checked. Accordingly, the sound source tracking unit 130 may track where a voice signal generated from the outside is generated.

Refer back to FIG. 2.

The driving unit 140 of the voice tracking apparatus 100 turns the second camera 113 toward the tracked sound source in step S107. In an embodiment, the driving unit 140 may be a driving motor. That is, the voice tracking apparatus 100 may use the driving motor to turn the second camera 113 toward the sound source tracked. In this case, a plurality of microphones may be mounted on the second camera 113 as described in FIG. 3 and as the second camera 113 turns toward the tracked sound source, the plurality of microphones may also turn toward the tracked sound source.

The second camera 113 of the voice tracking apparatus 100 turned toward the tracked sound source zooms in an image of where there is a sound source, in step S109. That is, while the first camera 113 is fixed, the second camera 113 may turn toward the tracked sound source and the second camera 113 turned may enlargedly capture an image of where there is a sound source.

Steps S107 and S109 are described with reference to FIGS. 6 and 7.

FIG. 6 shows the process of turning the second camera toward the tracked sound source according to an embodiment, and FIG. 7 shows the process of zooming in the image of where there is a sound source according to an embodiment.

Referring first to FIG. 6, the display device 200 is displaying the entire scene of a video conference being conducted. In this case, when a speaker 10 speaks, the sound source tracking unit 130 in FIG. 1 tracks the voice signal of the speaker to track the direction of a sound source. The second camera 113 may turn toward the direction of the tracked sound source, i.e., the location of the speaker 10.

Referring next to FIG. 7, while the second camera 113 turns toward where there is a speaker 10, it zoom-in captures an image of the speaker 10. In this case, the display device 200 may be kept in a state displaying the entire scene of the video conference.

Refer back to FIG. 2.

The image recognizing unit 150 of the voice tracking apparatus 100 recognizes an image of a sound source by using an image enlargedly captured through the second camera 113 in step S111. In particular, the image recognizing unit 150 may check whether the image of where there is a sound source is the image of the speaker. In an embodiment, the image recognizing unit 150 may detect the face of the speaker and the look of the speaker to check whether the image of where there is a sound source is the image of the speaker. A method of checking by the image recognizing unit 150 whether the image of where there is a sound source is the image of the speaker is described with reference to FIG. 8.

Figure 8:
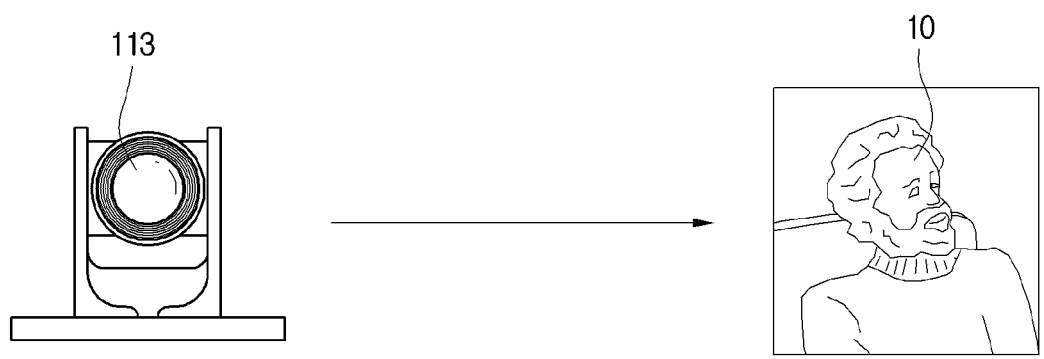
FIGS. 8 and 9 are diagrams for explaining the process of checking by a sound source tracking apparatus whether the image of where there is a sound source is an image of a speaker and matches an image of a speaker who is currently speaking.
Figure 9:
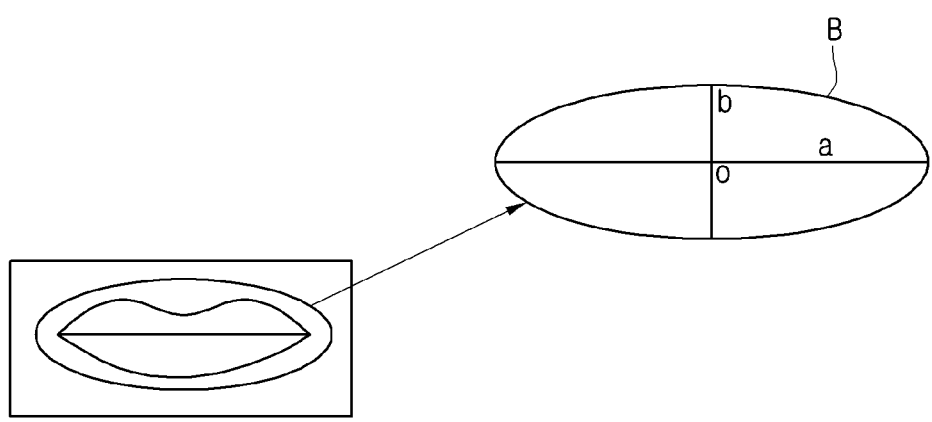

FIGS. 8 and 9 are diagrams for explaining the process of checking by the voice tracking apparatus whether the image of where there is a sound source is an image of a speaker and matches an image of a speaker who is currently speaking.

Referring to FIG. 8, there is shown an image captured and enlarged through the second camera 1130. The image recognizing unit 150 may extract the face features of the speaker by using the enlarged image, i.e., the eyes of the speaker, the nose of the speaker, the mouth of the speaker and the ears of the speaker.

In particular, the image recognizing unit 150 may extract the edges of the eyes, nose, mouth and ears of the speaker, through an Eigenface algorithm. The Eigenface algorithm is an algorithm used for low-dimensionally recognizing a high-dimensional image by using a plurality of Eigen vectors to easily express a face.

The image recognizing unit 150 may individually extract the contours of the eyes, nose, mouth and ears through the Eigenface algorithm. Referring to FIG. 9, there are shown the contour A of a mouth region of the speaker and a closed curve B of the contour of the mouth region. In general, since whether the speaker is currently speaking may be expressed through a change in shape of mouth, an embodiment assumes that an image of the speaker who is currently speaking is checked by using the contour A of the mouth region of the speaker and the closed curve B is an ellipse.

The long-axis length of the closed curve B is referred to as c and the short-axis length thereof is referred to as d. The ratio between the long-axis length and the short-axis length of the closed curve B may vary depending on what the speaker is speaking. That is, the image recognizing unit 150 may compare the relative ratio between the long-axis length and the short-axis length of the closed curve B to check whether the speaker is currently speaking. More particularly, the image recognizing unit 150 may compare the relative ratio between the long-axis length and the short-axis length of the closed curve B and thus determine that a speaker of an enlarged image is currently speaking, when the relative ratio varies a reference number of times within a preset time. In an embodiment, when the relative ratio varies two times or more within two seconds, it may be determine that the speaker of the enlarged image is speaking but in this case, the two seconds and the five times are only examples.

Refer back to FIG. 2.

The control unit 170 of the voice tracking apparatus 100 checks whether an image recognized with a sound source matches an image of the speaker in step S113, and transmits, to the display device 200, the image of the speaker enlargedly captured through the second camera 113 in step S115, when the image recognized with the sound source matches the image of the speaker.

On the other hand, when the image recognized with the sound source is not the image of the speaker, the process returns to step S101.

The control unit 170 of the voice tracking apparatus 100 beamforms the voice of the speaker that is being captured through the second camera 113, in step S117.

Steps S115 and S117 may also be simultaneously performed.

In an embodiment, the control unit 170 may use delay-sum beamforming to beamform the voice of the speaker. Related descriptions are provided with reference to FIG. 10.

Figure 10:
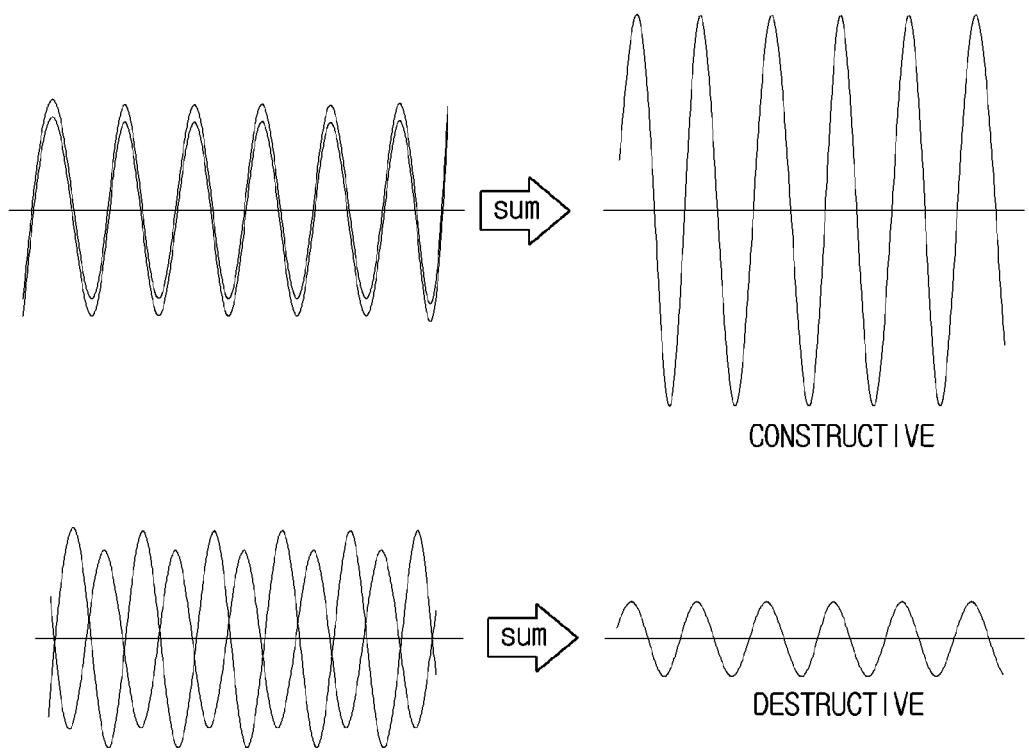
FIG. 10 is a diagram for explaining the process of beamforming the voice of a speaker by using Delay-Sum beamforming according to an embodiment.

FIG. 10 is a diagram for explaining the process of beamforming the voice of the speaker by using Delay-Sum beamforming according to an embodiment.

When it is assumed that a voice signal received from the sound source is a sinusoidal signal having a frequency of f, there is a difference in phase between voice signals received from the first microphone 111 and the second microphone 113 according to the sound source angle θ by the TDOA as described in FIG. 5. The difference in phase may be expressed by Equation 2 below:

$$\Delta\phi = 2\pi f t_{delay} \qquad [\text{Equation 2}]$$

When the difference in phase is appropriately compensated for, constructive interference occurs only on the tracked sound source and destructive interference occurs on other sound sources, not the tracked sound source, as shown in FIG. 10. According to the appropriate compensation for the difference in phase, the voice tracking apparatus 100 may intensively obtain the voice signal of a desired sound source.

Accordingly, since the voice of the speaker is selectively obtained in the process of conducting a video conference, a conference participant may focus on the talk of the speaker.

Also, since the focus of sound source beamforming matches the direction of the second camera 113 all the time, there is an effect in that there is no need to focus the sound source beamforming according to the location of the sound source.

Refer back to FIG. 2.

The control unit 170 of the voice tracking apparatus 100 checks whether the voice of the speaker is continuously received for three seconds, in step S119. In this example, the three seconds are only an example.

If the voice of the speaker is not received for the three seconds, the process returns to step S101 and if the voice of the speaker is received for the three seconds, the process returns to step S117.

According to an embodiment, the above-described method may also be embodied as processor readable codes on a program-recorded medium. Examples of the processor readable medium are a ROM, a RAM, a CD-ROM, a magnetic tape, a floppy disk, and an optical data storage device, and the method is also implemented in the form of a carrier wave (such as data transmission through the Internet).

The above-described image tracking apparatus is not limited to the configuration and method of described embodiments, and some or all of the embodiments may also be selectively combined so that various variations may be implemented.

The invention claimed is:

1. A control method of a voice tracking apparatus, the method comprising:
   tracking a sound source of a voice signal generated from the outside;
   turning an image capturing unit of the voice tracking apparatus toward a location of the tracked sound source, wherein the image capturing unit comprises a second camera including at least one microphone, and the at least one microphone is mounted on one side of the second camera; and
   beamforming the voice signal of the sound source through the at least one microphone mounted on the one side of the second camera,
   wherein the turning the image capturing unit comprises turning the second camera toward the location of the tracked sound source,
   wherein the at least one microphone mounted on the one side of the second camera turns in conjunction with the turning of the second camera, and
   wherein the at least one microphone mounted on the one side of the second camera turns toward the tracked sound source if the second camera turns toward the tracked sound source.

2. The control method according to claim 1, further comprising:
   enlargedly capturing an image corresponding to the location of the tracked sound source through the image capturing unit.

3. The control method according to claim 2, further comprising: checking whether an image of the sound source is an image of a speaker, from the captured image,
   wherein the enlargedly capturing of the image corresponding to the location of the tracked sound source comprises enlargedly capturing the image of the speaker when the image of the sound source is the image of the speaker.

4. The control method according to claim 3, wherein the checking of whether the image of the sound source is the image of the speaker comprises detecting changes in the face and mouth shapes of the speaker from the captured image to check whether the image of the sound source is the image of the speaker.

5. The control method according to claim 1, wherein the tracking of the sound source comprises tracking the difference of the sound source by using a time difference of arrival (TDOA) technique.

6. The control method according to claim 1, wherein the beamforming of the voice signal of the sound source comprises beamforming the voice signal of the sound source by using delay and sum beamforming.

7. The control method according to claim 1, wherein the image capturing unit comprises a first camera and the second camera.

8. A voice tracking apparatus comprising:
   an image capturing unit including a second camera;
   at least one microphone mounted on one side of the second camera and receiving a voice signal generated from the outside;
   a sound source tracking unit tracking a sound source of the received voice signal;
   a driving unit turning the image capturing unit toward a location of the tracked sound source; and
   a control unit beamforming the voice signal of the tracked sound source through the at least one microphone mounted on the one side of the second camera according to the turning of the image capturing unit, wherein the driving unit turns the second camera toward the location of the tracked sound source, wherein the at least one microphone mounted on the one side of the second camera turns in conjunction with the turning of the second camera, and wherein the at least one microphone mounted on the one side of the second camera turns toward the tracked sound source if the second camera turns toward the tracked sound source.

9. The voice tracking apparatus according to claim 8, wherein the image capturing unit comprises a first camera and the second camera, wherein the first camera captures the entire image, and wherein the second camera enlargedly captures an image corresponding to the location of the tracked sound source of the entire image.

10. The voice tracking apparatus according to claim 9, further comprising:

an image recognizing unit checking whether an image of the sound source is an image of a speaker, from the captured image.

11. The voice tracking apparatus according to claim 10, wherein the image recognizing unit detects changes in the face and mouth shapes of the speaker from the captured image to check whether the image of the sound source is the image of the speaker.

12. The voice tracking apparatus according to claim 8, wherein the driving unit comprises a driving motor.

\* \* \* \* \*